(12) United States Patent
Savin et al.

(10) Patent No.: US 8,796,342 B2
(45) Date of Patent: Aug. 5, 2014

(54) OIL GEL

(75) Inventors: Gabriela Savin, Lisieux (FR); Veronique Clement, Bulle (CH); Jin-Mi Jung, Epalinges (CH); Raffaele Mezzenga, Zurich (CH); Martin Leser, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/574,210

(22) PCT Filed: Jan. 20, 2011

(86) PCT No.: PCT/EP2011/050722
§ 371 (c)(1),
(2), (4) Date: Jul. 19, 2012

(87) PCT Pub. No.: WO2011/089171
PCT Pub. Date: Jul. 28, 2011

(65) Prior Publication Data
US 2012/0289610 A1 Nov. 15, 2012

(30) Foreign Application Priority Data
Jan. 20, 2010 (EP) .................................... 10151198

(51) Int. Cl.
*A01N 25/00* (2006.01)
*A61K 47/00* (2006.01)

(52) U.S. Cl.
USPC ............ 514/773; 426/601; 426/613; 510/513

(58) Field of Classification Search
None
See application file for complete search history.

(56) References Cited

U.S. PATENT DOCUMENTS

| 6,468,579 | B1 | 10/2002 | Roussel et al. | |
|---|---|---|---|---|
| 2009/0304896 | A1* | 12/2009 | Romoscanu et al. | ......... 426/601 |
| 2010/0047358 | A1 | 2/2010 | Pouzot et al. | |

FOREIGN PATENT DOCUMENTS

| CA | 2303561 | | 9/2001 |
|---|---|---|---|
| EP | 1894477 | | 3/2008 |
| GB | 1556297 | | 11/1979 |
| JP | 464628134 | B * | 8/1968 |
| WO | 03079802 | | 10/2003 |
| WO | 2004049819 | | 6/2004 |
| WO | WO 2004049819 | A2 * | 6/2004 |
| WO | WO 2007107490 | A1 * | 9/2007 |
| WO | 2008025784 | | 3/2008 |
| WO | WO 2008025784 | A1 * | 3/2008 |
| WO | 2009082229 | | 7/2009 |

OTHER PUBLICATIONS

Hughes et al, Trends in Food Science & Technology 20 (2009) 470-480.*
Venkata et al, Macromolecules 2012, 45, 01982-1999.*
Abstract of JP46028134-XP002632710.
Yan et al., "A dendron based on natural amino acids: sysnthesis and behaviour as an organogelator and lyotropic crystal", Angew. Chem. Int. Ed. 1005, 44, 6025-6029.
Hamada et al., "Engineering amyloidgenicity towards the development of nanofibrillar materials", Trends in Biotechnology, Elsevier Publications, vol. 22, No. 2, Feb. 1, 2004—XP 004486418.

* cited by examiner

*Primary Examiner* — Wu-Cheng Winston Shen
*Assistant Examiner* — Jean Cornet
(74) *Attorney, Agent, or Firm* — K&L Gates LLP (57) ABSTRACT

The present invention relates to the field of oil thickeners and in particular oil gels. Embodiments of the present invention relate for example to a an oil composition containing at least one complex comprising an oil dispersible emulsifier and protein fibers and preparations comprising such oil compositions; the use of such complexes as oil thickeners, and a method to produce the complexes.

17 Claims, 8 Drawing Sheets

OIL GEL

CROSS REFERENCE TO RELATED APPLICATIONS

The present application is a National Stage of International Application No. PCT/EP2011/050722, filed on Jan. 20, 2011, which claims priority to European Patent Application No. 10151198.8, filed on Jan. 20, 2010, the entire contents of which are being incorporated herein by reference.

The present invention relates to the field of oil thickeners and in particular oil gels. Embodiments of the present invention relate for example to a an oil composition containing at least one complex comprising an oil dispersible emulsifier and protein fibres and preparations comprising such oil compositions; the use of such complexes as oil thickeners, and a method to produce the complexes.

Margarine and spreads are well known in the art and have enjoyed considerable commercial success. Basically, they are water-in-oil emulsions. The oil phase is a blend of liquid oil and fat that is solid at normal ambient temperature (20° C.). The solid fat, often designated as hardstock, acts as a structuring agent, and stabilises the dispersion.

The choice of fat that can practically be used as structuring agent is rather limited. If the melting point of the structuring agent is too high the melting properties in the mouth are unsatisfactory. If the melting point is too low, the emulsion stability will be negatively affected.

Ideally the structuring agent should melt or dissolve at mouth temperature; otherwise the product will have a heavy, waxy mouthfeel. Another limitation of the conventional spreads is related to the relatively high amounts of saturated fatty acids (SFA) which are usually used in order to generate the solid texture.

SFA are known to contribute to an elevated blood cholesterol level and therefore associated with a high risk of cardiovascular disease. As clinical studies have established that the substitution of saturated fats with highly unsaturated oils can lower the risk of these chronic diseases, food industry has started looking for an oil-based product that is solid at room temperature without incorporating harmful saturated fatty acids (i.e. animal fats and tropical oils).

A comprehensive up-to-date summary of oil-structuring research routes can be found in Pernetti, M.; van Malsen, K. F.; Floter, E.; Bot, A. Current Opinion in colloid & Interface Science 2007, 12, 221-231.

The current food-grade alternatives to saturated fatty acids are the fatty alcohols and the fatty acid derivatives like: mono- and diacylglycerols, waxes, wax esters and sorbitan esters. Certain combinations of structurant agents like: fatty acids and fatty alcohols or lecithin and sorbitan tri-stearate exhibit synergism, i.e. they are more effective when used together. The wide variety of both current and future applications of oil structuration has been outlined in several reviews (Hughes, N. E.; Marangoni, A. G.; Wright, A. J.; Rogers, M. A.; Rush, J. W. E. Trends in Food Science & Technology 2009, 1-11. Vintiloiu, A.; Leroux, J.-C. Journal of Controlled Released 2008, 125, 179-192. Abdallah, D. J.; Weiss, R. G. Advanced Materials 2000, 12, 1237-1247. Terech, P., Weiss, R. G. Chemical Reviews 1997, 97, 3133-3159.).

There have been various attempts in the food industry to provide new healthy spreads.

In United States Patent US 2008/0268130 A1 saturated fat was replaced by plant sterols. The disclosure relates to an edible oil continuous spread comprising from 5 to 85 weight-% edible oil and from 0.1 to 20 weight-% plant sterols (a mixture of sitosterols and oryzanol) in the form of elongated crystals.

Nestlé patent EP 06111524A describes an interesting approach to oil structuration: an oil-in-water emulsion is prepared, where the stabiliser is a milk protein. The protein is cross-linked at droplet interface by heat treatment. Upon drying, a transparent gel is obtained with "foam" of protein lamella in the continuous oil phase.

Much of the effort to create healthy food ingredients having the properties of a plastic fat is focused on the use of monoglycerides gels. U.S. Pat. No. 6,156,369 discloses a food spread comprising an edible oil (from about 85 weight-% to about 98 weight-%) and a monoglyceride (from about 15 weight-% to about 2 weight-%).

U.S. Pat. No. 6,569,478 discloses a low-fat edible spread, comprising a water-monoglyceride mesophase gel, with water content higher than 80%.

WO 2005/107489 discloses a food spread and/or a whipped topping with 50% water, between 4% and 7% monoglyceride, about 0.2% to 0.35% anionic surfactant and oil until 100%. The oil phase is entrapped in a cellular solid matrix, where the walls have a monoglyceride-based multilamellar structure.

However, there remains a need in the art to provide food compositions that can be used as an edible continuous fat spread or can be incorporated into oil based food products to increase their consistency.

The present inventors have addressed this need.

Consequently, it was the object of the present invention to improve the state of the art and to provide the art with a composition that can be used to prepare spreadable fats and/or to increase oil viscosity.

The present inventors were surprised to see that they could achieve this object by the subject matter of the independent claims. The dependant claims further develop the present invention.

Accordingly, the inventors could show for example, that a formulation comprising protein fibres form natural sources, e.g., β-lactoglobulin (BLG) fibres, phosphatidylcholine (PC) and oil will form an organogel.

For example, long protein fibres with a contour length of between 1 and 10 μm and/or short protein fibres with an average contour length between 100 and 300 nm may be used.

Figure 4A:
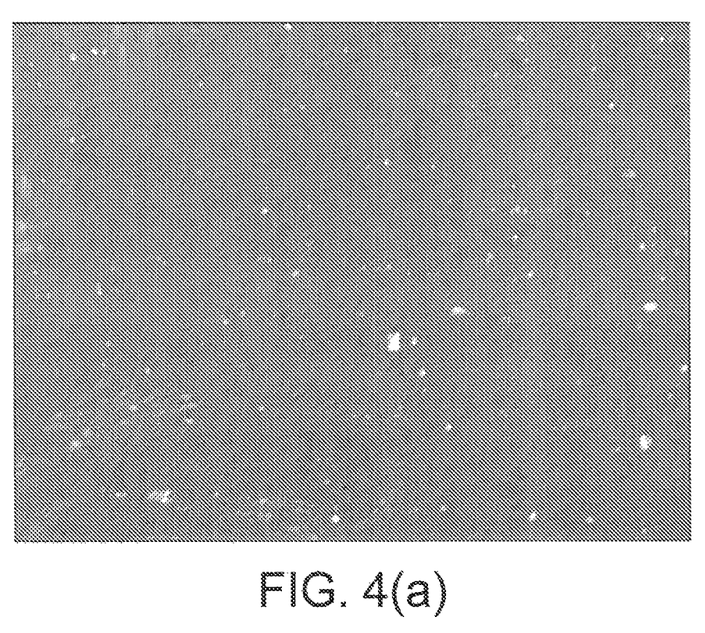
FIG. 4a shows a polarizing microscopy image and in particular the lamellar oily-streaks textures of the system PC/βlg long fibres/sunflower oil between cross-polarisers at 20° C. (27 wt % PC: 8 wt % βlg long fibers: 65 wt % sunflower oil). Samples prepared in sunflower or soybean oil with concentrations of long βlg fibres between 4 and 8 wt % and concentrations of PC between 20 and 30 wt % have a cloudy, solid-like appearance and are birefringent with a oily-streaks texture, typical for the lamellar phase.
Figure 4B:
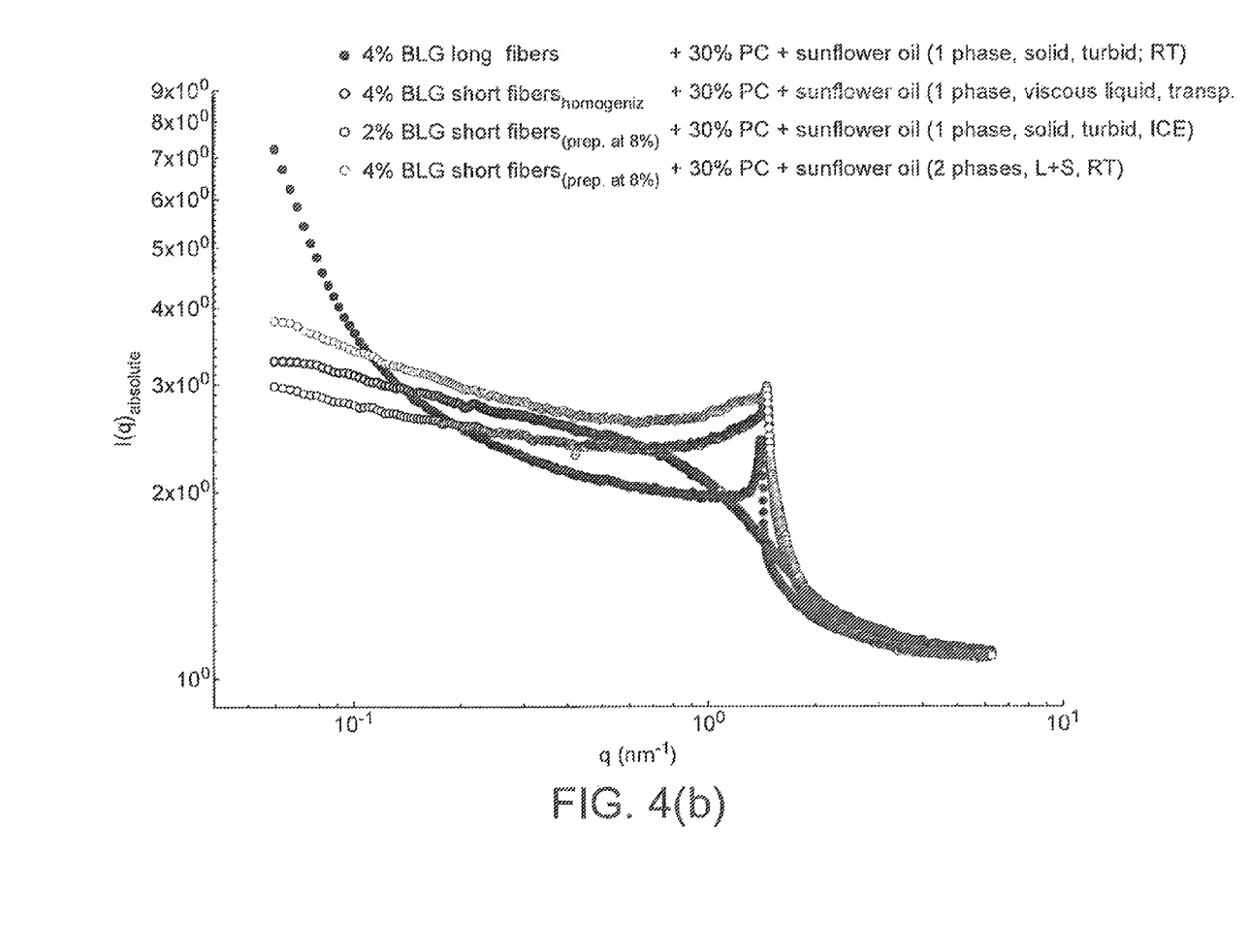
FIG. 4b shows SAXS data for a PC/βlg fibres/sunflower oil system showing the existence of lamellar structures at high q values and aggregation of lamellar liquid crystalline particles at low-q scattering values

The length of the protein fibres has an influence on the q values as illustrated in FIG. 4b. For long fibres the spectrum shows one single peak at the highest q value with a shoulder at lower q values. The peak indicates existence of a lamellar phase with a repeat distance d=4.473 nm. This value is fully consistent with PC length of 2.2 nm and with the low hydration of sample.

Assembling of lamellar liquid crystals into larger aggregates, mediated by the βlg fibers is suggested by the increasing of the scattered intensity at low q-values. Globular food proteins, such as whey-proteins, pure β-lactoglobulin (BLG), a commercial whey protein isolate preparation (WPI), plant proteins such as soy, pea, lupin, wheat, rice, potato or canola proteins, and/or egg-white proteins, e.g., ovalbumin may—for example—be used as protein for the present invention.

Proteins fibres may be prepared from globular proteins by using the following method.

The proteins are heated to a temperature above their denaturation temperature, at a pH of about 2 and at a low ionic strength of about I=0.01M. The proteins will assemble into fibrils, although the fibrils may vary significantly in aggregation mechanism, contour length and stiffness. To ensure high conversion rates and to avoid fibril disintegration upon subsequent slow cooling, long heating periods (between 5 and 10 hours) may be carried out. Smaller fibrils in the form of granular aggregates are obtained for whey protein isolate (WPI) (contour length between 1 and 6 μm) while long strings of monomers correspond to pure beta-lactoglobulin (BLG) (contour length between 1 and 10 μm). In the case of ovalbumin, the average contour length increases with protein concentration from 50 nm at 2 weight-% up to 200 nm at 7 weight-%. Soy glycinin and soy protein isolate (SPI) form branched fibrillae with a contour length of between 0.1 and 4 μm. Fibrils formed from SPI were more branched than the fibrils of soy glycinin.

Typically, protein fibers of the present invention have an insert aspect ratio in the range of 25 to 5000, preferably in the range of 50 to 2500.

A composition comprising protein fibres form natural sources, e.g., β-lactoglobulin (BLG) fibres and oil dispersible emulsifiers such as phosphatidylcholine (PC) can be used to replace saturated fatty acid hardstocks, the classical solution for oil solidification.

β-Lactoglobulin is on example of a protein that may be used in the framework of the present invention.

β-Lactoglobulin (BLG) is a major bovine whey protein, available in large quantities from a waste product of cheese production, namely whey. It has numerous health benefits and is a natural compound.

Oil dispersible emulsifiers include fatty acids and glycerol fatty acids esters, mono- and di-glycerides and their derivatives, long chain alcohols, sorbitan esters, polyoxyethylene sorbitan esters, propylene glycol mono or di-esters, phospholipids such as phosphatidylcholine or phosphatidylethanolamine (cephalins), polar lipids from plants, oat lipids, glycolipids such as glycol-sphingolipids (cerebrosides, gangliosides), sulfatides, sterols, sugar/sucrose esters and polyglycerol esters.

Bovine β-lactoglobulin is a relatively small protein of 162 residues, with an 18.4 kDa molecular weight. β-lactoglobulin fibres may be formed from β-lactoglobulin monomers or dimers under prolonged heating at low pH and low ionic strength (Bromley, E. H. C., et al., 2005, Faraday Discussions. 128:13-27).

Phosphatidylcholines are also a class of natural compounds with several health benefits. Phosphatidylcholines play a role in the anabolic and in the catabolic lipid metabolism.

Hence the alternative to solidify fats offered by the present invention has the advantage that it replaces saturated fatty acids by a healthy and natural alternative.

β-Lactoglobulin may be obtained from milk, for example bovine milk, sheep milk, goat milk, horse milk, camel milk or soy milk. Bovine milk is preferred.

In the present invention, the inventors show that a complex formation between BLG fibres and phosphatidylcholine (PC) can be used to replace saturated fatty acid hardstocks.

Hence, one embodiment of the present invention is an oil composition containing at least one complex comprising an oil dispersible emulsifier and protein fibres.

By the term "complex" is meant any form of association of the at least one protein fibre, e.g., β-lactoglobulin fibre, and at least one oil dispersible emulsifier, e.g., phosphatidylcholine.

The term "oil dispersible" means that the hydrophobicity of the apolar part of the emulsifier is enough not to precipitate in oil and not to make insoluble aggregates in oil.

The complexes described in the present invention may be complexes formed at least in part or primarily by hydrophobic interactions.

Complex formation primarily by hydrophobic interactions occurs widely in nature, for example during the formation of membranes, micelles, and during protein folding where folding often starts with tryptophane residues forming a hydrophobic core.

Hydrophobic interactions occur when hydrophobic molecules are inserted into an aqueous medium. The water molecules assemble around the hydrophobic molecules and maximise the hydrogen bonding of the water molecules around a hydrophobic surface. If hydrophobic molecules meet, they will associate with their hydrophobic surfaces towards each other. The water molecules, which were attached to these surfaces, are distributed back into the bulk solvent generating favourable entropy.

Other forms of interaction, e.g., electrostatic interactions, may contribute to the complex formation as well.

The complexes of the present invention may be prepared simply by mixing protein fibres and, e.g., phosphatidylcholine with methanol. The methanol may then be removed from the mixture. For the preparation of an oil composition comprising the complexes of the present invention, the oil and the complexes may be combined.

The complexes of the present invention may contain further proteins, such as milk protein and/or whey protein, for example. The whey protein may be, e.g., sweet whey protein or acid whey protein, preferably from bovine origin.

The complex may have the advantage of being food-grade. A material is food-grade if it consists of compounds that are approved for human or animal consumption.

The complexes of the invention may be provided in several forms, for example in the form of a solution, a gel, or a dried powder.

The complexes of the present invention may have several structures. Micelle structures are one possibility as are fibre like structures.

Figure 3:
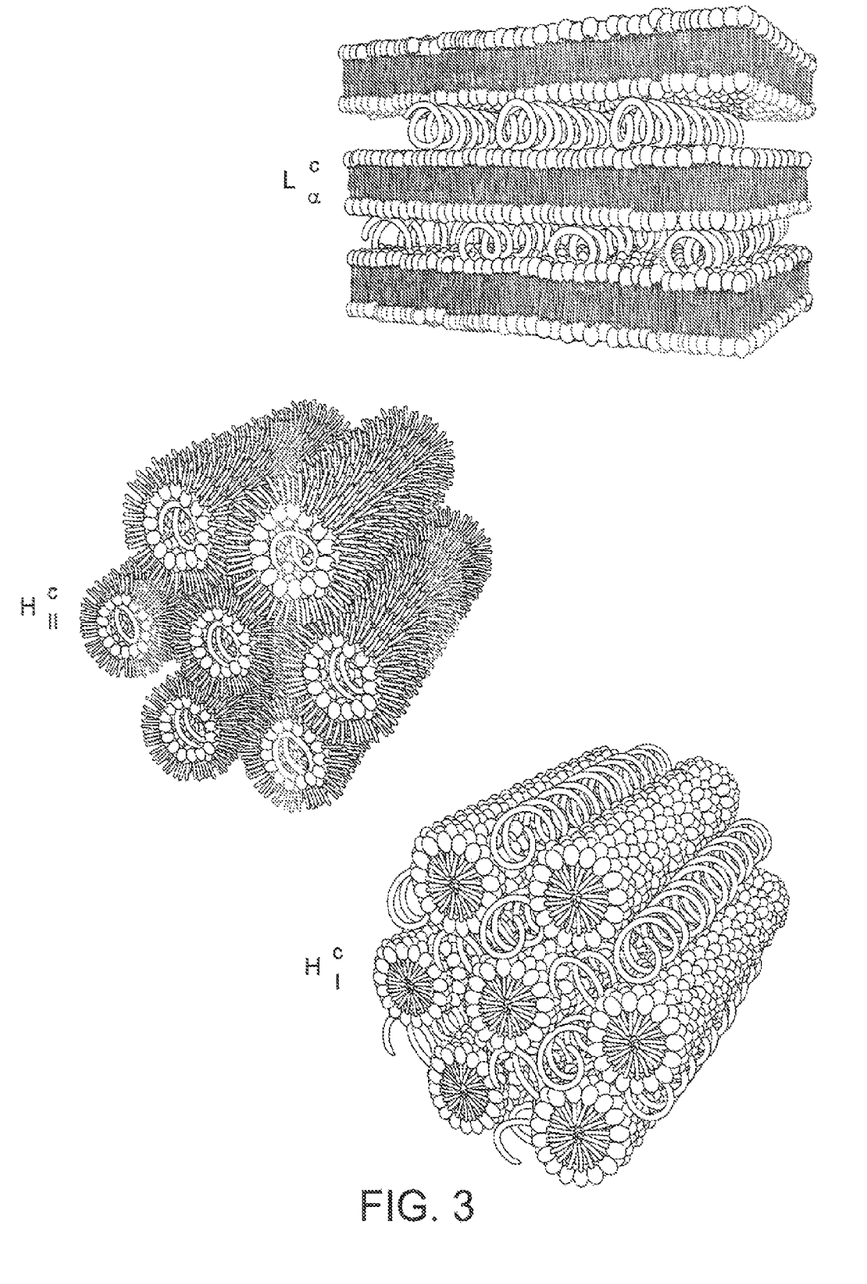
FIG. 3 shows structures of complexes formed by phosphatidylcholine and β-lactoglobulin fibres: complexed lamellar $L_\alpha^c$ (a), complexed inverted hexagonal $H_{II}^c$ (b), and complexed micellar hexagonal $H_I^c$ (c).

Typical complexes formed by phosphatidylcholine and β-lactoglobulin fibres may have the structures that are depicted in FIG. 3. For example, the complexes may be present as complexed lamellar arrangements ($L_\alpha^c$), complexed inverted hexagonal arrangements ($H_{II}^c$), complexed micellar hexagonal arrangements ($H_I^c$), or combinations thereof.

Lamellar arrangements, for example, have the advantage that the resulting compositions are movable in plane, which has a positive effect on the spreadability of the final product.

When dispersed in oil, pure PC forms reverse micelles. The micelles are extremely sensitive to the presence of water and small polar molecules. When a critical amount of water (1-2 moles of water per mole of PC) is added to a solution of PC in mineral oils like decane, iso-octane or hexane, the uniaxial growth of the reverse micelles into flexible cylinders takes place. The subsequent entanglement of cylinders into a transient network transforms the solution into organogel. In 2006 S. R. Raghavan et al. have shown that the bile salts, due to their unique facially amphiphilic structure can play a role analogous to that of water promoting the longitudinal aggregation of PC reverse micelles in nonpolar organic liquids (Tung, S.; Huang Y.; Raghavan, S. R. *J. Am. Chem. Soc.* 2006 128 5751). In both cases, the binding of polar molecules to the PC head group will increase the head group area of lipid while tail area will stay the same. This change of geometry is considered to be responsible for the transition to long, cylindrical reverse micelles. The response of the system upon further water addition depends on lipid concentration: at PC<25 wt % the system turns into a gel phase and pure isooctane and at PC>25 wt % a gel and a lamellar phase are formed.

PC is less soluble in triglycerides by comparison with mineral oils (CMC=0.1 wt % in high oleic sun-flower oil and CMC=7.5 wt % in decane). The reduced solubility of PC results in a different pattern for the self-assembly of reversed micelles in triglyceride oils. At low water concentration (e.g. 2 wt % water are present in a solution of 8 wt % PC in soybean oil) PC exists as individual rigid bilayers, which aggregates into needle-like particles (Lei, L.; Ma, Y.; Kodali, R.; Liang, J.; Davis, H. D. *JAOCS* 2003 80, 4, 383). At a slightly higher water concentration (4 wt % water in a solution of 8 wt % PC) reversed vesicles ("onion-like structures") are formed. As water concentration increases further (5.3 wt % water in a solution of 8 wt % PC) the reversed vesicles start aggregating. When the water added exceeds the adsorption saturation point, (8 wt % water in a solution of 8 wt % PC), the aggregates sediments and a free water phase is formed in addition to the oil phase.

In one embodiment, the complexes of the present invention comprise phosphatidylcholine sandwiched between β-lactoglobulin fibres.

The complexes may comprise the oil dispersible emulsifier, e.g., phosphatidylcholine, and protein fibres, e.g., β-lactoglobulin fibres, in a weight ratio of about 1:1 to 10:1, preferably of about 2:1 to 5:1, more preferably of about 3:1.

Typically, the protein fibres, e.g., β-lactoglobulin fibres and the oil dispersible emulsifier, e.g., phosphatidylcholine, are present in the complex in a weight ratio in the range of about 20:1 to 1:20, preferably in a mole ratio in the range of about 10:1 to 1:1, most preferable in the range of about 5:1 to 1:1.

The weight ratio of oil dispersible emulsifier, e.g., phosphatidylcholine, to the protein, e.g., β-lactoglobulin, in the complexes of the present invention may vary from about 4:1 to 15:1, for example from about 5:1 to 12:1.

The complex of the present invention may be used as an oil thickener. As such, the complex may be used for the preparation of an edible continuous fat spread or can be incorporated into oil based food products to increase their consistency.

The present invention concerns an oil composition comprising at least one complex described in the present invention.

The oil composition comprising the complexes of the present invention may have any pH. Typically, however, the composition of the present invention has a pH in the range of about 2 to 9, preferably of about 3 to 7.

The weight ratio of the oil dispersible emulsifier, e.g., phosphatidylcholine, to the protein, e.g., β-lactoglobulin in the oil composition of the present invention may vary from about 4:1 to 15:1, for example from about 5:1 to 12:1.

The oil dispersible emulsifier, e.g., phosphatidylcholine, and the protein fibres may serve as structurant agent in the oil composition.

The oil composition may comprise any kind of oil. For food applications the oil should be a food grade oil. Typical food grade oils that can be used in the framework of the present invention are sunflower oil, soybean oil, rapeseed oil, sesame oil, corn oil or olive oil, for example.

For non-food applications also mineral oils, such as decane, may be used.

The oil composition comprising the complexes described in the present invention may form an organogel.

An organogel is a no n-crystalline, non-glassy thermoreversible (thermoplastic) solid material composed of a liquid organic phase entrapped in a three-dimensionally cross-linked network.

The organogels of the present invention have the advantage that they are thermoreversible and shear sensitive. Hence, the proposed oil composition mimics the behaviour of saturated fat: a solid is formed at low temperature while at high temperature the gel becomes liquid and resolidifys upon cooling.

The total amount of structurant agent in the final organogel can, for example, vary from 15 weight-% to 34 weight-% corresponding to a total amount of edible oil from 66 weight-% to 85 weight-%.

In one embodiment, the oil composition comprises at least 70 weight-% oil.

The water content of the oil composition of the present invention may be below ~1 weight-% and may vary between about 0.1 and 1 weight-%, for example between about 0.36 and 0.46 weight-%.

Hence, the oil composition of the present invention may comprise about 50-85 weight % oil, about 5-15 weight-% protein fibres, e.g., β-lactoglobulin fibres, and about 10-40 weight-% oil dispersible emulsifier, e.g., phosphatidylcholine.

The oil composition of the present invention, in particular if present as organogel, may have a storage module G' in the range of about 25-40 Pa and a loss module G" in the range of 50-70 Pa at a temperature of 25° C. In one embodiment the storage and loss module (G' and G") at 25° C. are about 34 and 60 Pa, respectively.

The subject matter of the present invention extends to a preparation comprising the oil composition of the present invention.

Such a preparation may be a food product, a nutraceutical, a food additive, a medicament, or a cream for topical application, for example.

Compositions and/or products comprising the complexes of the present invention are preferably selected from desserts, frozen desserts, dairy products, petfood, culinary products, clinical nutrition products etc. In particular, they may include sauces, soups, mayonnaises, salad dressings, creams, ice cream, chocolate, mousses, and/or milk.

Typical food products may be also selected from the group consisting of fillings, dips, sauces, mayonnaises, spreads, toppings, dairy-based products, milk and/or cream based foams and/or emulsions, a salad dressings, soups, beverages or oral food supplements.

The complexes or compositions of the invention may also be used in cosmetic products such as creams, foams, mousses, gels, shampoos, emulsions, etc.

Pharmaceutical products to which the complexes of the invention may be added include tablets, capsules, or gels.

Those skilled in the art will understand that they can freely combine all features of the present invention described herein, without departing from the scope of the invention as disclosed.

Further advantages and features of the present invention are apparent from the following Examples and Figures.

FIG. 1 shows viscosity profiles.

FIG. 2 shows Storage (G') and loss (G") moduli as a function of temperature for several oil gel samples.

EXAMPLES

Oil-gels (organogels) are prepared by melting a mixture of BLG fibres and PC in edible oil at 70° C. Upon cooling at room temperature, a solid-like material is formed for a structurant composition ratio PC:BLG fibres of 4:1 which corresponds to 4% BLG fibres, 30% PC and 66% oil.

An oil thickening was already observed for a long fibres PC:BLG ratio of about 15, i.e. 2% BLG long fibres, 31.4% PC and 66.% oil.

Rheology

Rheology was used to investigate the mechanical properties and the thermal stability of the gel.

Measurements were performed using an Anton Paar Rheometer (MCR500), equipped with a cone/plate geometry (2° angle and 25 mm diameter).

Figure 1A:
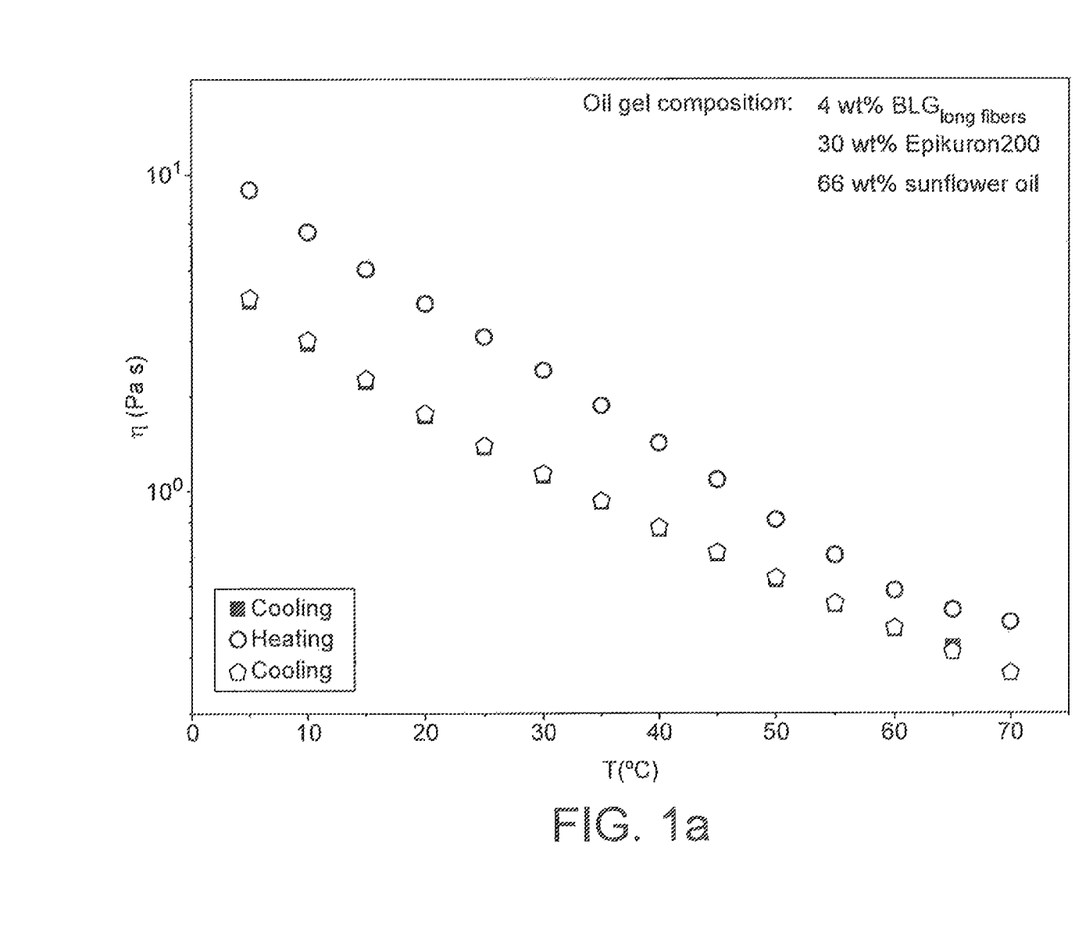
FIG. 1a shows the viscosity profile of sample containing 4 weight-% BLG long fibers, 30% phosphatidylcholine and 66% sunflower oil, during cooling from 70 to 5° C. at 5° C./min at 100 s$^{-1}$, heating to 70° C. at 5° C./min at 10 s$^{-1}$ and second cooling from 70 to 5° C. at 5° C./min at 100 s$^{-1}$.
Figure 1B:
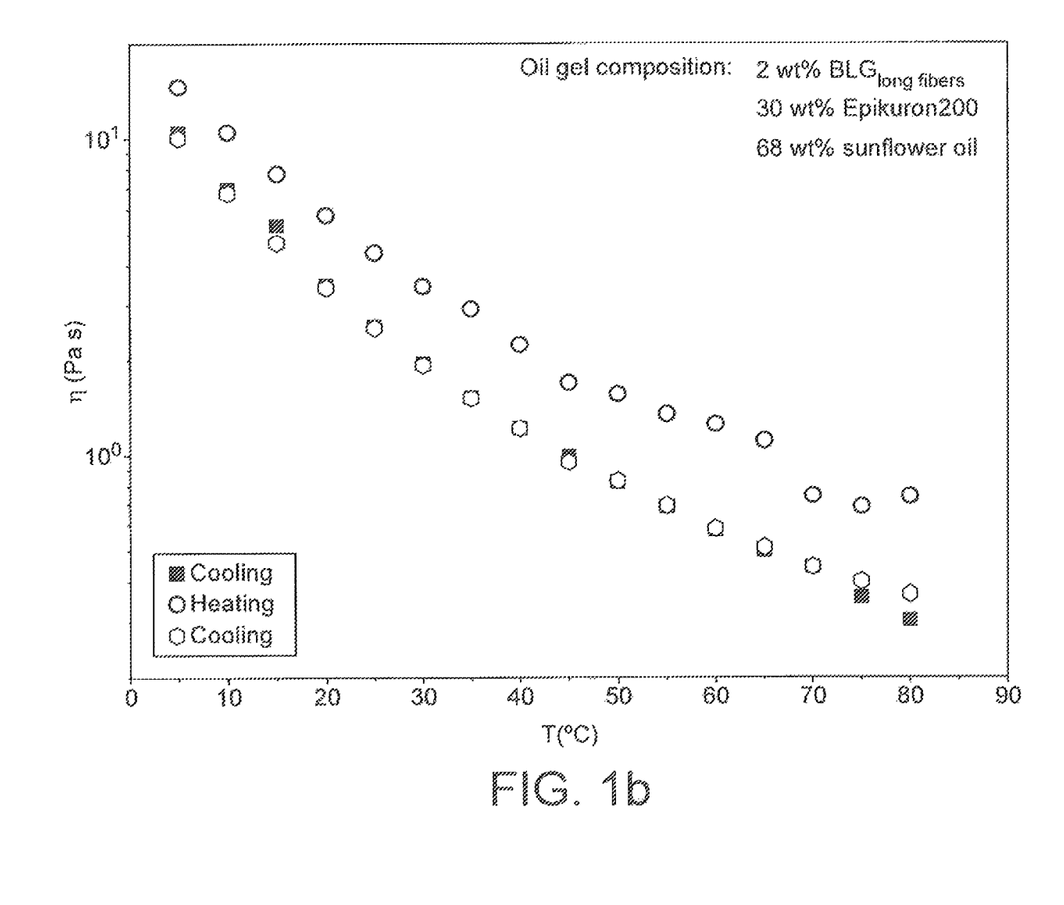
FIG. 1b shows the viscosity profile of a sample containing 2 weight-% BLG long fibers, 30% phosphatidylcholine and 68% sunflower oil, during cooling from 80 to 5° C. at 5° C./min at 100 s$^{-1}$, heating to 80° C. at 5° C./min at 10 s$^{-1}$ and second cooling from 80 to 5° C. at 5° C./min at 100 s$^{-1}$.

To investigate the thermal stability of the gels, the instrument was operated in flow mode, varying the temperature between 5 and 70° C. Samples were heated to 70° C.; then they were cooled to 5° C. at 5° C./min. The viscosity was measured at a constant shear rate (100 s$^{-1}$) during cooling. Then the samples were heated again to 70° C. at 5° C./min at constant shear rate (10 s$^{-1}$). They were cooled again to 5° C. at 5° C./min at a constant shear rate (100 s$^{-1}$) to assess the thermal reversibility. FIGS. 1a and 1b show the viscosity of two representative samples, with solid-like and liquid-like behaviour, as a function of temperature. For 2 weight-% BLG long rods and 30 weight-% PC, the structurant is completely soluble in the vegetable oil. A viscous transparent solution is obtained (η solution=0.380 Pa·s at T=25° C. and a shear rate of 100 s–1, $\eta_{solution}$=0.588 Pa·s at T=25° C. and a shear rate of 10 s–1 by comparison with $\eta_{sunflower\ oil}$=0.081 Pa·s at T=25° C.).

The first cooling curves show in both cases a steep increase of the viscosity. The same viscosity profile is obtained when the samples are heated showing that the structure collapses, i.e. it is completely melted around the melting temperature of PC ($T_{melting}$PC=65° C.). Both viscosity profiles upon cooling match very well, showing the thermal reversibility, a typical feature of organogels.

Figure 2A:
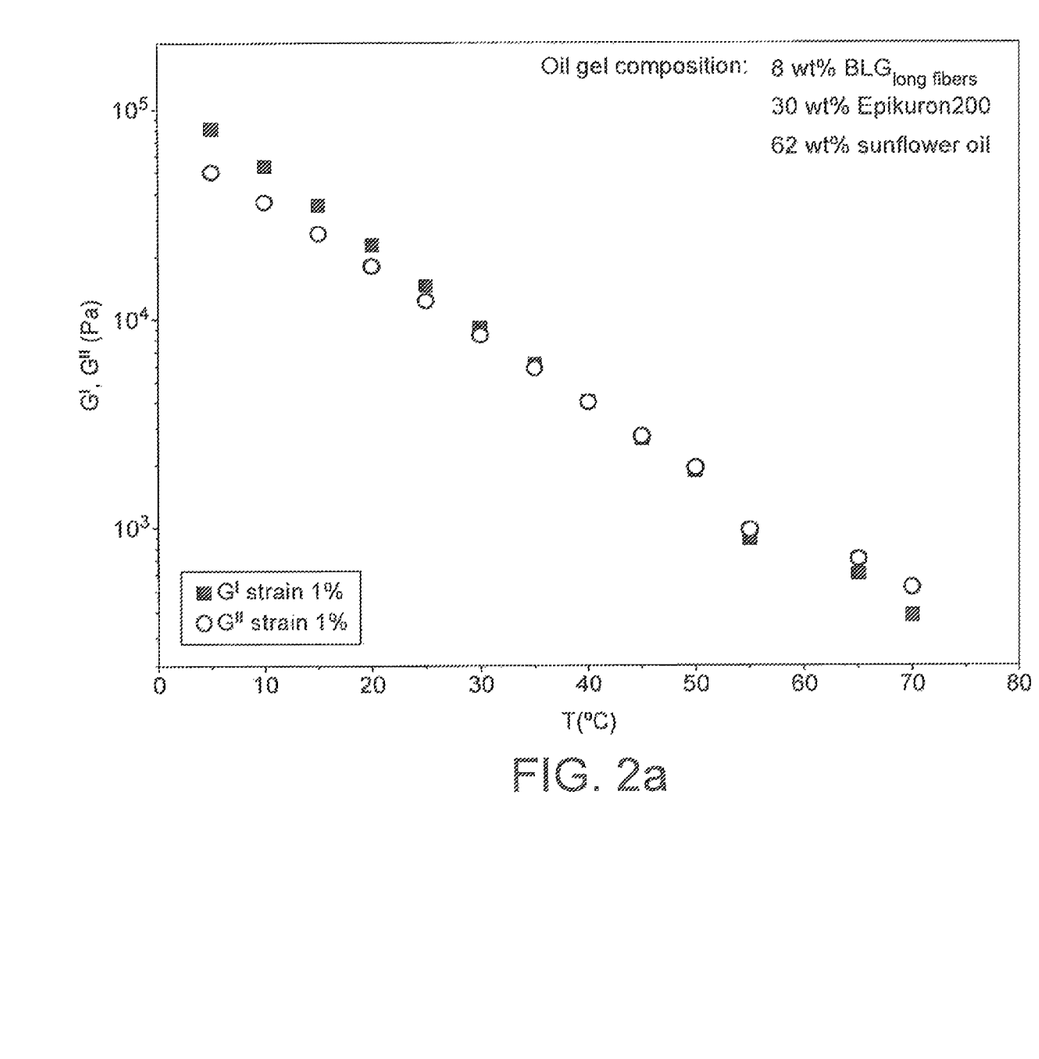
FIG. 2a shows storage (G') and loss (G") moduli as a function of temperature for an oil gel sample which contains a high amount of BLG fibres (8 weight-%) and 30 weight-% PC.
Figure 2B:
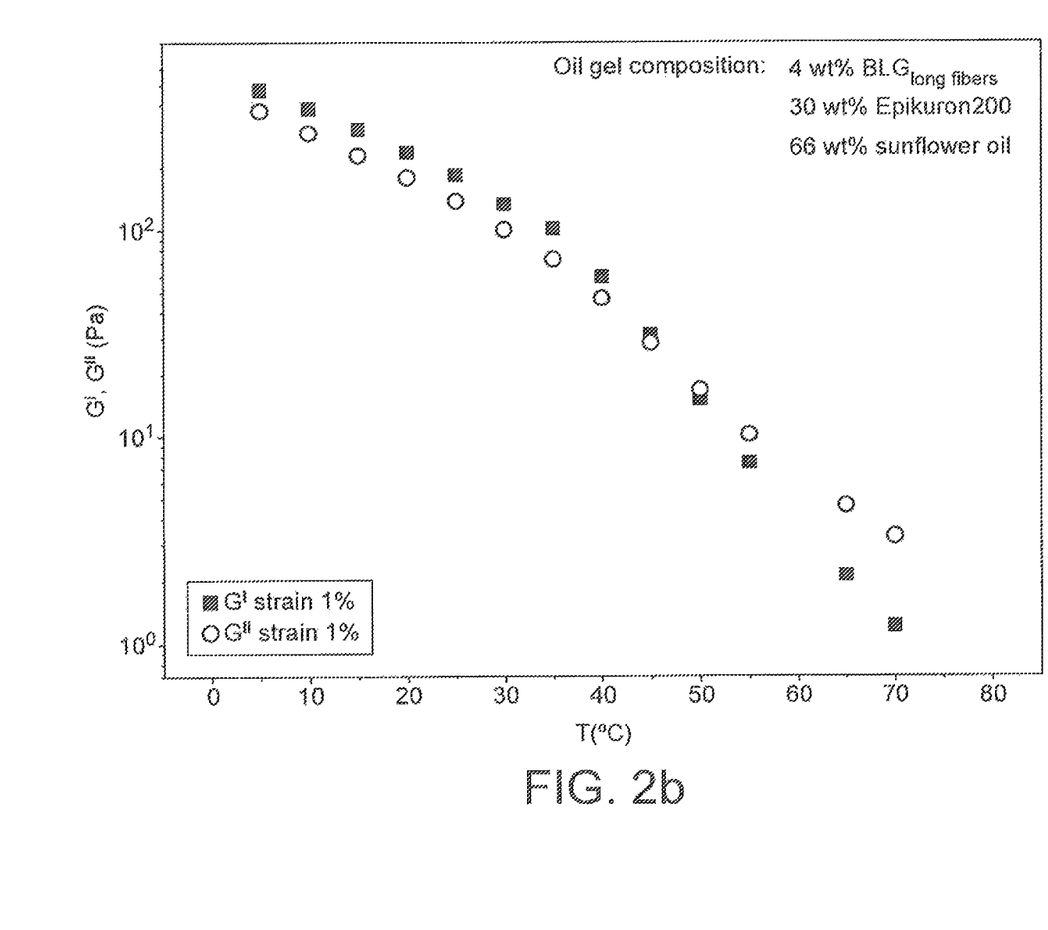
FIG. 2b shows storage (G') and loss (G") moduli as a function of temperature for an oil gel sample which contains an intermediate amount of BLG fibres (4 weight-%) and 30 weight-% PC.
Figure 2C:
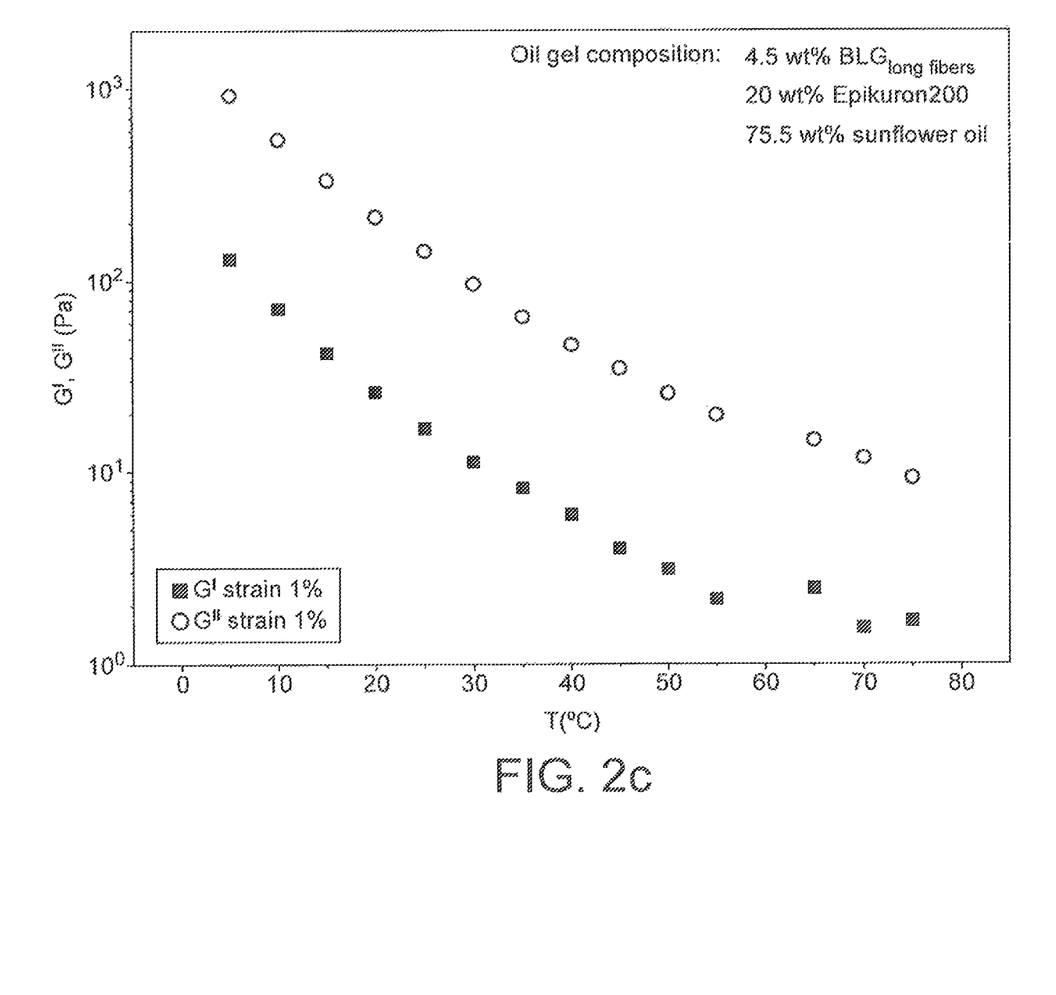
FIG. 2c shows storage (G') and loss (G") moduli as a function of temperature for an oil gel sample which contains an intermediate amount of BLG fibres (4 weight-%) and 20 weight-% PC (a low amount of PC).

Mechanical properties of the oil gels have been investigated by oscillatory rheology. The temperature dependences of the storage (G') and loss (G") moduli for different structurant composition are shown in FIGS. 2a, b, and c.

All structurant/oil mixtures show a steep decrease of G' and G" with increasing the temperature.

Real oil structuration happens at 8 or 4 weight-% BLG long rods and 30% PC and this solid-like behaviour persists until around 50° C. On the other hand, for 4 weight-% BLG long rods and 20% PC the sample is still viscous but has a liquid-like behaviour.

Complex Structure in a PC/βlg Fibres/Vegetable Oil System:

Polarizing microscopy is commonly used to distinguish the characteristic texture of different types of mesophases. If the sample is anisotropic and shows strong birefringence, the texture observed through crossed polarizers develops bright regions. Dark regions mean that there is no birefringence (isotropic structure) or a rather weak birefringence. Samples prepared in sunflower or soybean oil with concentrations of long βlg fibres between 4 and 8 wt % and concentrations of PC between 20 and 30 wt % have a cloudy, solid-like appearance and are birefringent with a oily-streaks texture, typical for the lamellar phase (FIG. 4a).

The SAXS spectrum (FIG. 4b) for the system PC/βlg long fibres/sunflower oil (27 wt % PC: 8 wt % βlg long fibers: 65 wt % sunflower oil) shows one single peak at the highest q value with a shoulder at lower q values. The peak indicates existence of a lamellar phase with a repeat distance d=4.473 nm. This value is fully consistent with PC length of 2.2 nm and with the low hydration of sample but discards the presence of protein fibers within the lamellar phase. Assembling of lamellar liquid crystals into larger aggregates, mediated probably by the βlg fibers is suggested by the increasing of the scattered intensity at low q-values (FIG. 4b).

The invention claimed is:

1. An oil composition comprising at least one complex comprising an oil dispersible emulsifier and protein fibers, wherein the oil composition is formulated as an organogel and comprises about 50-85 weight-% oil, about 5-15 weight-% protein fibers and about 10-40 weight-% oil dispersible emulsifier.

2. The oil composition in accordance with claim 1 wherein the protein is selected from the group consisting of a globular protein, a whey protein isolate, plant proteins, and egg-white proteins.

3. The oil composition in accordance with claim 1 wherein the oil dispersible emulsifier is selected from the group consisting of: fatty acids and glycerol fatty acids esters, mono- and di-glycerides and their derivatives, long chain alcohols, sorbitan esters, polyoxyethylene sorbitan esters, propylene glycol mono or di-esters, phospholipids, polar lipids from plants, oat lipids, glycolipids, sulfatides, sterols, sugar/sucrose esters and polyglycerol esters.

4. The oil composition in accordance with claim 1, wherein the complexes are at least in part present as complexed lamellar arrangements ($L_\alpha^c$).

5. The oil composition in accordance with claim 1, wherein the complex comprises the oil dispersible emulsifier and protein fibers in a weight ratio of about 1:1 to 10:1.

6. The oil composition in accordance with claim 1, wherein the oil composition has a water content of less than 1 weight-%.

7. The oil composition in accordance with claim 1, wherein the oil composition comprises at least about 70 weight-% oil.

8. The oil composition in accordance with claim 1, wherein the complex is formed at least in part by hydrophobic interactions.

9. The oil composition in accordance with claim 1, wherein the oil dispersible emulsifier is phosphatidyl choline.

10. The oil composition in accordance with claim 1, wherein the composition is made by mixing the protein fibers and the oil dispersible emulsifier with methanol to form a mixture, removing the methanol from the mixture to form a dried mixture, and adding oil to the dried mixture.

11. The oil composition in accordance with claim 1, wherein the protein fibers are made from globular proteins by heating the globular proteins to a temperature above a denaturation temperature of the globular proteins.

12. The oil composition in accordance with claim 1, wherein the protein fibers have a contour length between 1 and 10 μm.

13. The oil composition in accordance with claim 1, wherein the protein fibers have an average contour length between 100 and 300 nm.

14. The oil composition in accordance with claim 1, wherein the protein fibers have an aspect ratio from 25 to 5000.

15. A food preparation comprising an oil composition comprising at least one complex comprising an oil dispersible emulsifier and protein fibers, wherein the oil composition is formulated as an organogel and comprises about 50-85 weight-% oil, about 5-15 weight-% protein fibers and about 10-40 weight-% oil dispersible emulsifier.

16. The food preparation in accordance with claim 15, wherein the composition is selected from the group consisting of a food product, a neutraceutical, a food additive, a medicament, and a cream for topical application.

17. A method of making an oil composition of claim 1 comprising mixing an oil dispersible emulsifier ranging from about 20-40 weight-% with protein fibers ranging from about 5-15 weight-% to form a complex and adding an oil ranging from about 50-85 weight-% to said complex, wherein the oil composition is formulated as an organogel.

* * * * *